United States Patent
Maeno (10) Patent No.: US 6,742,381 B2
(45) Date of Patent: Jun. 1, 2004

(54) APPARATUS AND METHOD FOR EVALUATING DAMPING PERFORMANCE OF VIBRATION-DAMPING DEVICES

(75) Inventor: Hajime Maeno, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/354,548

(22) Filed: Jan. 29, 2003

(65) Prior Publication Data
US 2003/0172714 A1 Sep. 18, 2003

(30) Foreign Application Priority Data
Mar. 12, 2002 (JP) ......................................... 2002-067454

(51) Int. Cl.[7] .............................................. G01M 19/00
(52) U.S. Cl. .................... 73/11.01; 73/11.03; 73/11.04; 73/11.05; 73/12.01; 74/5.4; 74/5.5; 188/378
(58) Field of Search .............................. 73/11.01–11.05, 73/12.01; 74/5.4, 5.5; 188/378–381, 322.5, 218

(56) References Cited

U.S. PATENT DOCUMENTS

| | | | | |
|---|---|---|---|---|
| 3,927,594 A | * | 12/1975 | Morita | 84/237 |
| 4,211,105 A | * | 7/1980 | Szabo et al. | 73/11.05 |
| 4,744,684 A | * | 5/1988 | Maekawa | 400/167 |
| 5,952,581 A | * | 9/1999 | Lammers et al. | 73/831 |
| 2002/0112546 A1 | * | 8/2002 | Shibasaki et al. | 73/781 |

FOREIGN PATENT DOCUMENTS

| | | |
|---|---|---|
| JP | 8-193642 | 7/1996 |
| JP | 2001-271874 | 10/2001 |
| WO | WO 00/14429 | 3/2000 |

OTHER PUBLICATIONS

Hasegawa et al., U.S. Publication No. 2001/0026039 A1, Published on Oct. 4, 2001.

* cited by examiner

*Primary Examiner*—Edward Lefkowitz
*Assistant Examiner*—Alandra Ellington
(74) *Attorney, Agent, or Firm*—Bever Weaver & Thomas, LLP

(57) ABSTRACT

A damping performance evaluation apparatus for damping devices including: a support member detachably supporting a damping device in a state enabling the device to exhibit a damping effect thereof; a hammer member for applying oscillation force to the device caused by gravitational descent to strike the device; a double-strike preventing member for preventing the hammer member from dropping a second time due to rebound after initially striking the device, to prevent double-strike of the device by the hammer member; a vibration sensor installed at a vibration zone caused to vibrate through oscillation force applied by said hammer member, for outputting an electrical signal in response to vibration at the vibration zone; and a sensing member for sensing a vibration mode in the vibration zone on the basis of an output of said vibration sensor. A damping performance evaluation method is also disclosed.

14 Claims, 6 Drawing Sheets

APPARATUS AND METHOD FOR EVALUATING DAMPING PERFORMANCE OF VIBRATION-DAMPING DEVICES

INCORPORATED BY REFERENCE

The disclosure of Japanese Patent Application No. 2002-067454 filed on Mar. 12, 2002 including the specification, drawings and abstract is incorporated herein by reference in its entirety.

BACKGROUND OF THE INVENTION

1. Field of the Invention

The present invention relates to an apparatus and a method for evaluating damping performance or capability of vibration-damping devices, and to a testing method using the apparatus.

2. Description of the Related Art

A variety of vibration-damping devices using elastic members or the like have been employed or proposed in order to reduce vibration excited in apparatus and equipments of various kinds in which vibration would raise problems. The proposed vibration-damping devices have a variety of constructions including a so-called dynamic damper as disclosed in JP-A-8-193642 and a vibration-damping device as disclosed in WO00/14429, which are arranged in order to reduce vibrations and noises within the vehicle caused by oscillation force transmitted from a power unit, tires, and the like.

The dynamic damper taught by JP-A-8-193642, the vibration-damping device disclosed in WO00/14429, and similar devices may not always effectively exhibit the desired damping performance, due to deviation in factors such as component dimensions, materials and mass.

To ensure that final products consistently exhibit required damping performance, it is desirable to subject vibration-damping devices to performance evaluation testing prior to shipment. Specific examples of testing methods include, for example, (a) sweep oscillation methods, which involve subjecting the vibration-damping device to vibrational load at gradually varied frequency with an electromagnetic vibrator while measuring vibrational input/output characteristics in terms of phase angle, gain etc; and (b) hammering methods, which involve measuring vibrational characteristics including resonance frequency or other intrinsic values, while subjecting the vibration-damping device to impact force.

The former one, (a) sweep oscillation methods, have the disadvantage of high cost of testing equipment per se, as well of requiring some time for the vibration mode of the vibration-damping device to stabilize so that the total time required for a single test cycle, including installation and removal of the vibration-damping device in and from the testing device, can be as long as 120 seconds. For this reason, the sweep oscillating methods are impractical where all or virtually all of the final product units are to be tested. The latter case, (b) hammering methods, on the other hand, while affording shorter measuring times than sweep methods, have the drawback that due to the extreme difficulty of consistently controlling parameters such as the magnitude and direction of the impact force during measurement, the benchmark for evaluating damping performance is not always precise vis-à-vis the actual measurements obtained, so that these measurements can only be used as a general guide.

SUMMARY OF THE INVENTION

It is therefore an object of the present invention to provide a novel damping performance evaluation apparatus and damping performance evaluation method for vibration-damping devices whereby damping performance of vibration-damping devices can be measured quickly and with high accuracy, and a novel testing method for vibration-damping devices, which employs the vibration performance evaluation apparatus.

The above and/or other objects may be attained according to at least one of the following modes of the invention. Each of these modes of the invention is numbered like the appended claims and depending from the other mode or modes, where appropriate, to indicate possible combinations of elements or technical features of the invention. It is to be understood that the following modes or elements of the invention may be adopted at any possible optional combinations, and that the present invention is not limited to the following modes or combinations of these modes, but may otherwise be recognized based on the thought of the present invention that described in the whole specification and drawings or that may be recognized by those skilled in the art in the light of the disclosure in the whole specification and drawings.

(1) A damping performance evaluation apparatus for vibration-damping devices comprises: (a) a support member for detachably supporting a vibration-damping device in a state enabling the vibration-damping device to exhibit a damping effect thereof; (b) a hammer member for applying oscillation force to the vibration-damping device, caused by means of gravitational action to descent to strike directly or indirectly the vibration-damping device supported by the support member; (c) a double-strike preventing member for preventing the hammer member from dropping a second time due to rebound after initially striking the vibration-damping device, so as to prevent double-strike of the vibration-damping device by the hammer member; (d) a vibration sensor installed at a vibration zone caused to vibrate through oscillation force applied by the hammer member, for outputting an electrical signal in response to vibration at the vibration zone; and (e) a sensing member for sensing a vibration mode in the vibration zone on the basis of an output of the vibration sensor.

The damping performance evaluation apparatus constructed according to this mode of the invention is designed to allow damping performance of the vibration-damping device to be evaluated by applying oscillation force to the vibration-damping device while supported in the state enabling the device to exhibit damping effect. This is accomplished by causing the hammer member to undergo gravitational descent and strike the vibration-damping device directly or indirectly, and then measuring, by means of the vibration sensor and the sensing member, the vibration mode in the vibration zone caused to vibrate through oscillation force applied by the hammer member.

By means of the double-strike preventing member, the hammer member is prevented from dropping the second time due to rebound after initially striking the vibration-damping device, thus preventing double-strike of the vibration-damping device by the hammer member. This permits the vibration-damping device to be subjected to one cycle of a given level of initial oscillation force through gravitational action. Thus, in the initial stage of vibration, the vibration zone can be impacted consistently with oscillation force of constant magnitude and directionality, so as to provide uniform conditions for measurement over multiple tests. Measurements for a number of vibration-damping devices can thus be evaluated on the basis of a consistent benchmark, making it possible to judge damping performance satisfactory or unsatisfactory with a high degree of accuracy.

As a general principle, a single application of oscillation force through gravitational action to the vibration-damping device is enough to complete the measuring procedure, thereby allowing the vibration mode in the vibration zone to be measured quickly, so that testing of all vibration-damping device units prior to shipment, for example, is now viable.

A variety of know sensors those employing a piezoelectric element to output an electrical signal may be preferably employed as the vibration sensor in the present mode, for example. The sensing member may be suitably designed depending upon items of damping performance being evaluated, using, for example, an analog or digital level recorder, band pass filter, tracking filter, frequency analysis device, or the like. Preferably, a frequency analyzer employing a Fast Fourier Transform (FFT) is employed, for the sake of rapidity of measurement and ease of modifying measurement settings.

(2) A damping performance evaluation apparatus according to the above mode (1) further comprises hammer supporting mechanism for supporting the hammer member at a predetermined height, and for releasing the hammer member so as to allow the hammer member to descend under the gravitational action. The damping performance evaluation apparatus constructed according to this mode of the invention is capable of readily applying consistent oscillation force to vibration-damping devices to be evaluated.

(3) A damping performance evaluation apparatus according to the above mode (2) further comprises a lift driving device for lifting the hammer member against gravitational force and causing the hammer member to be supported at predetermined height by the hammer supporting means. This mode of the invention permits a simpler procedure for evaluating damping performance of the vibration-damping devices in comparison with the case where, for example, the hammer member is lifted manually to support it on the hammer supporting mechanism, and further facilitates automation of the evaluation process.

(4) A damping performance evaluation apparatus according to any one of the above modes (1)–(3), wherein the double-strike preventing member comprises (f) a rebound detection member for detecting displacement of the hammer member due to the rebound after initially striking the vibration-damping device and (g) retaining mechanism, actuated on the basis of the output of the rebound detection member, for retaining the hammer member rebounded after initially striking the vibration-damping device. The damping performance evaluation apparatus constructed according to this mode of the invention is designed so that displacement of the hammer member due to the rebound after initially striking the vibration-damping device is detected by the rebound detection member, and the retaining mechanism is actuated on the basis of the output of the rebound detection member in order to retain the hammer member as it rebounds after initially striking the vibration-damping device, thus making it possible to prevent the hammer member from dropping a second time. Double-strike of the vibration-damping device by the hammer member is thus effectively prevented.

The rebound detection member in this mode of the invention may comprises, for example, a limit switch or other element for detecting or sensing displacement of the hammer member through contact with the hammer member. Preferably, it is employed a non-contact element capable of detecting or sensing displacement of the hammer member without actually contacting the hammer member, such as an encoder, a proximity switch, a photoelectric switch, or the like. The retaining mechanism may be designed as any means or mechanism capable of releasably preventing the hammer member from falling. Examples of the retaining mechanism include a member or mechanism that retains the hammer member through mechanical grasping or magnetic attraction, or that retains the hammer member through friction or engaging force.

(5) A damping performance evaluation apparatus according to any one of the above modes (1)–(4), further comprises an arm member rotatably supported about a single axis, wherein the hammer member is fixed to an distal end of the arm member, and the arm member is rotatable about the single axis to support the hammer member at the predetermined height, and then to allow the hammer member to descend under gravitational action to strike directly or indirectly the vibration-damping device supported by the support member. The damping performance evaluation apparatus constructed according to this mode of the invention enables the arm member having the hammer member fixed to its distal end to be rotated about the single axis to thereby support the hammer member at the predetermined height, whereby a generally constant level of oscillation force applied by the hammer member dropping under the action of gravity may be readily achieved, by means of simple construction. In preferred practice, the present mode (5) will be combined with the above-described mode (3), in which case it will be advantageous for the lift driving device to comprise rotary actuating means or members for actuating the arm member about the single axis.

(6) A damping performance evaluation apparatus according to the above mode (5), further comprises a supplemental mass formed independently of the hammer member and attached to the arm member. According to this mode of the invention, the use of the supplemental mass makes it possible to readily reset magnitude of oscillation force produced by the hammer member. Described in detail, when the supplemental mass is attached to one side of the arm member opposite to the other side provided with the hammer member, with the center axis of rotation of the arm member disposed therebetween, the magnitude of the oscillation force produced by the hammer member can be decreased. When the supplemental mass is attached to the other side of the arm member to be interposed between the hammer member and the center axis of rotation of the arm member, on the other hand, the magnitude of the oscillation force produced by the hammer member can be increased.

(7) A damping performance evaluation apparatus according to any one of the above modes (1)–(6), wherein the vibration sensor is detachably attachable to the vibration zone by means of a magnet. The damping performance evaluation apparatus constructed according to this mode of the invention allows the vibration sensor to be attached and detached easily, thus further reducing a period of time needed for measurement.

(8) A damping performance evaluation apparatus according to any one of the above modes (1)–(7), wherein the apparatus is adapted to evaluate a damping performance of at least a vibration-damping device that constitutes a secondary vibration system wherein a damper mass is elastically supported on a damping target via a spring member, the vibration-damping device being supported by means of the support member at an mounting part thereof on the damping target, and the hammer member being caused to strike the vibration-damping device directly or indirectly to apply the oscillating force to the vibration-damping device. The damping performance evaluation apparatus constructed according to this mode of the invention is capable of suitably evaluating damping performance of such a vibration-damping device that constitutes the secondary vibration system attached to the damping target as the primary vibration system, and may also be usable for evaluating damping performance of a variety of dynamic dampers known in the art, for example.

(9) A damping performance evaluation apparatus according to the above mode (8), wherein the damper mass includes a rigid abutting portion and an independent mass member disposed on the rigid abutting portion such that the independent mass member is uncoupled from and independently displaceable relative to the rigid abutting portion, and that the independent mass member is brought into direct and elastic abutting contact with the rigid abutting portion in a direction of input of vibration to be damped. In the vibration-damping device to be evaluated by the damping performance evaluation apparatus constructed according to this mode of the invention, the arrangement of the independent mass member that controls damping performance of the vibration-damping device is not easily visible from the outside. However, the use of the damping performance evaluation apparatus constructed according to this mode of the invention makes it possible to easily carry out damping performance evaluation of such a vibration-damping device having a specific construction of this kind. Described in detail, where the abutting portion is a hollow housing having an interior space and the independent mass member is housed within the housing, for example, it may be difficult to ascertain from the outside whether the independent mass member is housed within the housing or whether the independent mass member comes into impact on the housing during input of vibration. However, the present damping performance evaluation apparatus makes it possible to readily ascertain whether the vibration-damping device has been manufactured to design standards and exhibits the desired damping effect.

(10) A damping performance evaluation apparatus according to any one of the above modes (1)–(7), the apparatus being adapted to evaluate a damping performance of at least a vibration-damping device including an abutting member fixable to a damping target and an independent mass member disposed on the abutting member such that the independent mass member is uncoupled from and independently displaceable relative to the abutting member, and that the independent mass member is brought into direct and elastic abutting contact with the abutting member in a direction of input of vibration to be damped, wherein an elastically deformable support member is provided in the support member, the abutting member of the vibration-damping device is fixed to the elastic support member, and oscillation force is applied to the vibration-damping device by directly or indirectly striking the abutting member with the hammer member. Like the above mode (9), the vibration-damping device to be evaluated by the damping performance evaluation apparatus constructed according to this mode of the invention suffers from difficulty in determining visually from the outside whether the device is good or defective. However, the use of the damping performance evaluation apparatus constructed according to this mode of the invention makes it possible to easily determine whether a unit is good or defective by means of performance evaluation, irrespective of invisibility of condition of the independent mass member.

(11) A damping performance evaluation method for vibration-damping devices comprises: (a) a vibrating step wherein a hammer member is dropped from a predetermined height under gravitational action to directly or indirectly strike a vibration-damping device and apply oscillation force to the vibration-damping device; (b) a double-strike preventing step wherein double-strike of the vibration-damping device with the hammer member is prevented by preventing the hammer member from dropping a second time upon rebound after initially striking the vibration-damping device; (c) a vibration measuring step wherein vibration mode in a vibration zone vibrated by means of the oscillation force of the hammer is measured; and (d) a sorting step wherein vibration-damping devices are sorted into good products and defective products on the basis of the results of measurement in the vibration measuring step.

According to the damping performance evaluation method of the present invention, the step (a) permits an application of the oscillation force to the vibration-damping device, and the step (b) permits a prevention of double-strike of the vibration-damping device with the hammer member, whereby it is possible to strike the vibration-damping device a single time with the hammer member dropped from a given height under gravitational action. This makes it possible to give the vibration zone consistently with oscillation force of constant magnitude and directionality, in the initial stage of vibration.

As a result, uniform conditions for measurement can be provided over multiple tests, so that measurements for a number of vibration-damping devices can be evaluated on the basis of a consistent benchmark. Vibration-damping devices can thus be separated into good and defective units in the step (d), on the basis of the measurements taken in the step (d).

(12) A vibration-damping device testing method wherein a damping performance evaluation method defined in the above-indicated mode (11) is implemented using a damping performance evaluation apparatus defined in any one of the above-indicated modes (1)–(10), at a point between production and shipment of vibration-damping devices.

According to the vibration-damping device testing method of the present invention, vibration modes of vibration zones can be measured quickly, so that all or nearly all manufactured vibration-damping devices can be tested at a suitable point between production thereof and shipping from the factory. This makes it possible to improve performance and reliability in shipped vibration-damping devices, while avoiding adverse effects on production costs and manufacturing efficiency during production of vibration-damping devices.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
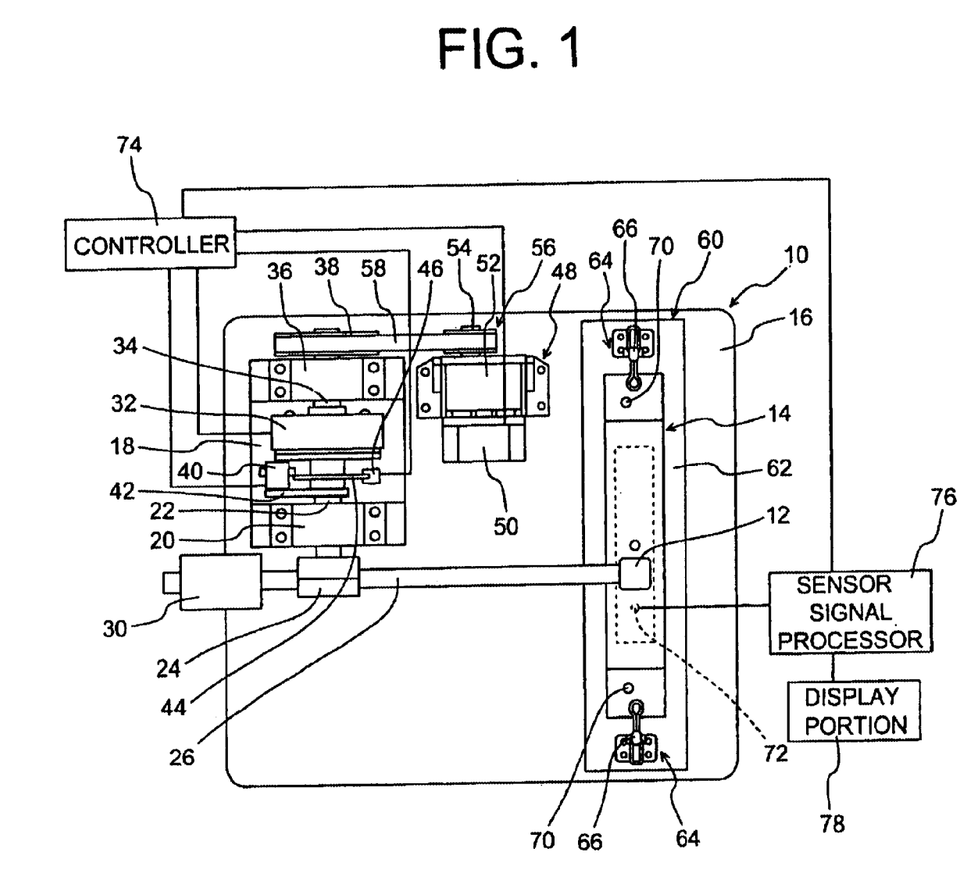
FIG. 1 is a top plane view of a vibration performance evaluation apparatus constructed according to one preferred embodiment of the present invention.
Figure 2:
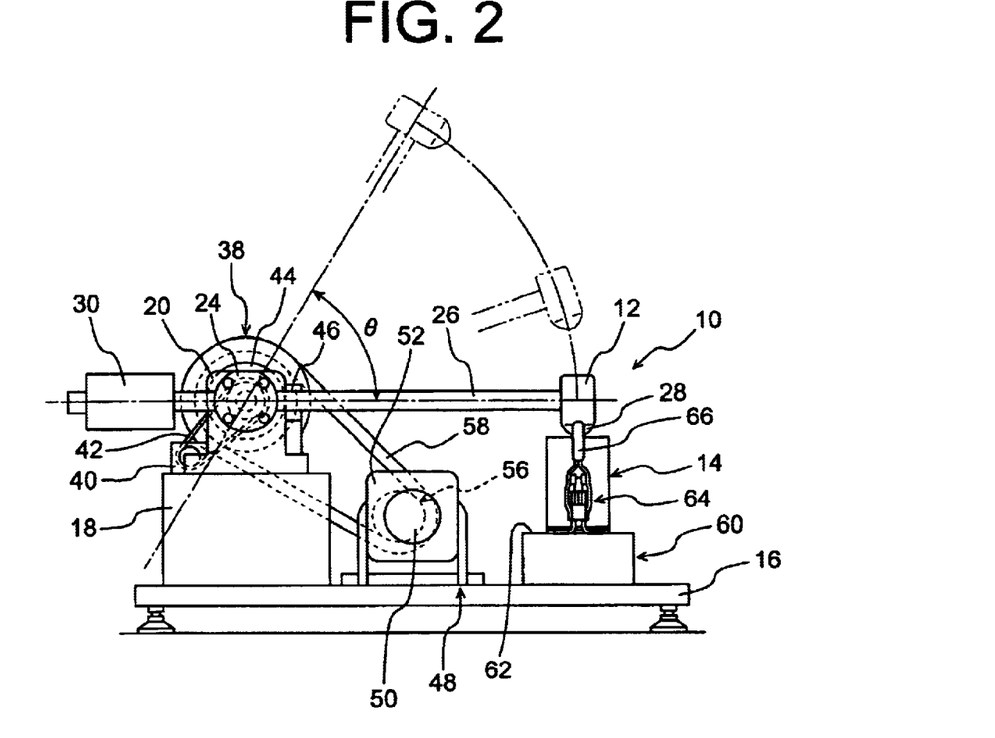
FIG. 2 is a left-side elevational view of the vibration performance evaluation apparatus of FIG. 1.
Figure 3:
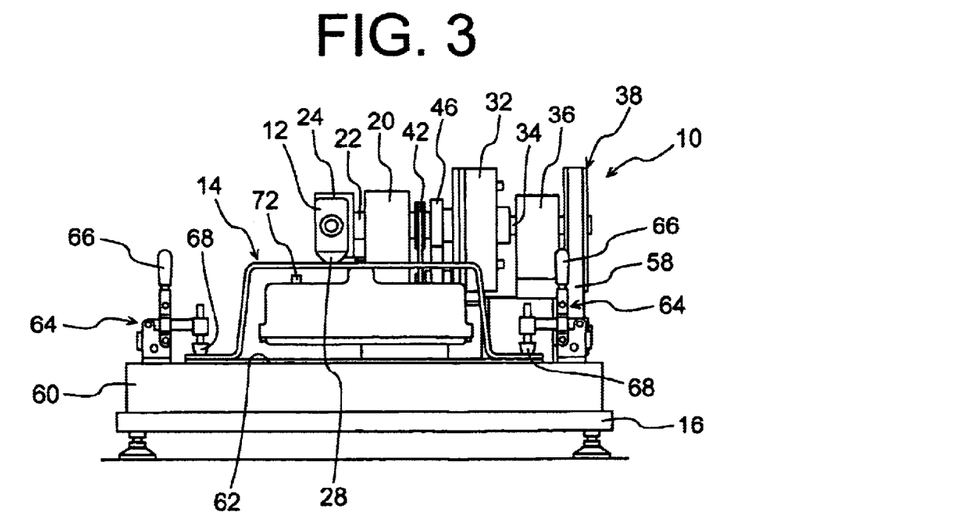
FIG. 3 is a front elevational view of the vibration performance evaluation apparatus of FIG. 1.

Referring first to FIGS. 1–3, there is shown a damping performance evaluation apparatus 10 for vibration-damping devices constructed according to a first embodiment of the present invention. This damping performance evaluation apparatus 10 measures damping performance or capability of a vibration-damping device 14 as a test object by striking the vibration-damping device 14 with a hammer member in the form of a hammer 12, and detecting or sensing a vibration mode in a vibration zone. In the following description, the vertical direction is basically oriented in the vertical direction as seen in FIG. 2, which is the plumb direction.

Described in detail, the damping performance evaluation apparatus 10 of this embodiment comprises a flat bed plate 16 disposed fixedly on a base, and a fixed block 18 fixed on the bed plate 16. An operating end bearing 20 is fixed over the fixed block 18, and the operating end bearing 20 supports a support shaft 22 extending in the horizontal direction such that the shaft 22 is not move in the axial direction but is rotatable about its center axis.

A linking head 24 is attached to one of opposite axial end of the support shaft 22 which projects from the operating end bearing 20, and an arm member in the form of a swing rod 26 is fixed to the linking head 24. The swing rod 26 has a longitudinal rod shape and is disposed extending in a direction orthogonal to the support shaft 22. The swing rod 26 fixed to the linking head 24 at a portion offset from its center to its one side in its axial direction, while being swingably supported about the support shaft 22 orthogonal to the swing rod 26.

The hammer 12 is fixed to one of axially opposite ends of the swing rod 26, which is projected a considerable distance from the support shaft 22 (the right end as seen in FIGS. 1 and 2). The hammer is roughly of rectangular block shape and projects out to both sides of the swing rod 26 in a direction of swing. The swing rod 26 and the hammer 12 are both made of metal or other rigid materials. A strike portion 28 made of synthetic resin is bonded to one of opposite end face of the hammer 12 which is projected from the swing rod 26 (the downwardly facing end face as seen in FIG. 2). This strike portion 28 is used to strike the vibration-damping device 14 described hereinbelow.

A supplemental mass in the form of a weight 30 is fixed to the other axial end, i.e., the shorter projecting end of the swing rod 26. This weight 30 is a thick ring member made of metal or other high specific gravity materials, and disposed radially outwardly on the swing rod 26 while being fixed to the swing rod 26 at a suitable axial positions by means of a bolt or other fastening or positioning means (not shown). By adjusting the position of the weight 30 on the swing rod 26, the rotational moment of the swing rod 26 about the support shaft 22 due to gravitational action can be adjusted, thus making it possible to adjust magnitude of the energy with which the hammer 12 strikes the vibration-damping device 14 when the swing rod 26 is allowed to turn freely from a predetermined rotational position, in other words, to adjust magnitude of oscillation force applied to the vibration-damping device 14 by the hammer 12.

The other axial end of the support shaft 22, which is supported by the operating end bearing 20, is linked to a drive shaft 34 via a clutch 32. The drive shaft 34 is disposed extending in the horizontal direction, and is rotatably supported about its center axis by a drive end bearing 36 fixed to the fixed block 18. The drive shaft 34 is arranged in a co-axial relationship with the support shaft 22 while being fixed at one axial end thereof to a driven pulley 38 and being linked at the other end via the clutch 32 to the other axial end of the drive shaft 34. The clutch 32 alternately engages and disengages the support shaft 22 and the drive shaft 34 to and from each other, in order to control transmission of rotational force between the two shafts 22, 34. For this purpose, an electromagnetic clutch capable of rapid operational control by an electrical signal is suitably used.

A rotary encoder 40 is disposed to one side of the support shaft 22, and the support shaft 22 and the rotary encoder 40 are normally interlocked by means of an interlock belt 42 secured on the fixed block 18 and passed around the support shaft 22. With this arrangement, the swing direction and an amount (angle) of swing of the support shaft 22 can be detected as an electrical signal by the rotary encoder 40. Additionally, a rotating disk 44 is fixed to the support shaft 22 so as to rotate integrally with the support shaft 22, and a positioning sensor 46 for sensing a predetermined rotational position of the rotating disk 44 is disposed on the fixed block 18. In this respect, the positioning sensor 46 is adapted to output an sensor signal, once the support shaft 22 has reached a predetermined rotational position to raise the swing rod 26 upwardly to a preset given angle θ.

To the side of the fixed block 18, there is juxtaposed a lift driving device in the form of a drive unit 48 that is fixed on the bed plate 16. The drive unit 48 comprises an electric motor 50 and a reducing gear mechanism 52. The output of the electric motor 50 is stepped down by means of the reducing gear mechanism 52 so as to rotate an output shaft 54 of the reducing gear mechanism 52. A drive pulley 56 is fixed to the output shaft 54 of the reducing gear mechanism 52, and a drive belt 58 encircles the drive pulley 56 and the driven pulley 38 fixed to the drive shaft 34. In this arrangement, a driving power generated from the electric motor 50 is transmitted to the drive shaft 34, and then to the support shaft 22 via the clutch 32.

The electric motor 50 may be selected from electric motors known in the art, such as AC motors or DC motors. A synchronous motor is preferable for use in the present embodiment since it can produce strong positioning torque (detent torque) in its non-energized state. Application of electric current to the electric motor 50 with the clutch 32 in its engaged state causes the swing rod 26 to swing in the direction lifting the hammer 12 upwardly with respect to the support shaft 22 (i.e., counterclockwise direction as seen in FIG. 2).

A support block 60 for supporting the vibration-damping device 14 is secured onto the bed plate 16 at a position situated under the downswing of the hammer 12 when the swing rod 26 rotates. The support block 60 has a generally longitudinal thick plate configuration, whose upper surface serves as a flat support face 62 enabling the vibration-damping device 14 to be positioned on this support face 62. At the two lengthwise ends of the support block 60 are provided a pair of clamps 64, 64 as a support member.

Each of the clamps 64 is designed to force a pressure pad 68 down onto the support face 62 by manually toggling a control lever 66. The use of a toggle mechanism or spring in each clamp 64, for example, permits an operator to operate the control lever 66 with less force to thereby cause the pressure pad 68 to apply a greater clamping force towards the support face 62, while providing tactile response during operation of the control lever 66, so that the operator can choose to apply or release clamping force on the support face 62 by the pressure pad 68 based on the tactile response.

The vibration-damping device 14 for performance evaluation is placed on the support block 60, and the two ends of the vibration-damping device 14 are clamped against the support face 62 of the support block 60 by the pair of clamps 64, 64 to fixedly support the vibration-damping device 14 thereon. The vibration-damping device 14 may be released quickly from the support block 60 by manually operating the control levers 66, 66 of the clamps 64, 64 to release the clamping force of the pressure pads 68, 68. Positioning pins 70, 70 project up from the support face 62 of the support block 60 so that the vibration-damping device 14 can be placed accurately in a preset location on the support face 62.

A vibration sensor in the form of an acceleration sensor 72 is detachably attached to the vibration-damping device 14 so that the vibrational mode of the vibration-damping device 14 can be output as an electrical signal by the acceleration sensor 72. A variety of known sensors such as those using piezoelectric elements known in the art are suitable as the acceleration sensor 72. The acceleration sensor 72 may be fixed to the vibration-damping device 14 using an instant adhesive or bolts for example, in the present embodiment. Alternatively, a permanent magnet is attached to the acceleration sensor 72 so that the acceleration sensor 72 may be secured to the vibration-damping device 14 through the magnetic force of the permanent magnet.

With the vibration-damping device 14 positioned securely on the support block 60 as described above, retaining force on the swing rod 26, which has been positioned at a predetermined rotational angle θ, is released, allowing the hammer 12 to drop downwardly due to gravitational action, whereby the strike portion 28 of the hammer 12 strikes the vibration-damping device 14, thus applying impact oscillation force to the vibration-damping device 14. After being struck by the hammer 12, the vibration-damping device 14 is sensed in terms of its vibrational mode by the acceleration sensor 72 attached to the vibration-damping device 14 so that the damping performance of the vibration-damping device 14 can be measured.

In the present embodiment, a controller 74 controls operation of the clutch 32 (engagement and disengagement) and operation of the electric motor 50 (start and stop) on the basis of signals from the rotary encoder 40 and the positioning sensor 46 so that the strike portion 28 of the hammer 12 suitably strikes the vibration-damping device 14 so as to give impact oscillation force to the vibration-damping device 14. A sensing member in the form of a sensor signal processor 76 processes the measured damping performance of the vibration-damping device 14 in the form of an output signal generated from the acceleration sensor 72. The result of this process is displayed on a display portion 78.

More specifically, when the controller 74 is connected to a power supply, the controller 74 first determines whether there is a sensor signal input to the controller 74 from the positioning sensor 46, in other words, whether the swing rod 26 is positioned at the predetermined rotational angle θ. In the case where the swing rod 26 is not positioned at the predetermined rotational angle θ, the clutch 32 receives from the controller 74 a signal for engaging the clutch 32 so as to place the clutch 32 in its engaged state, and the electric motor 50 receives from the controller 74 an actuating signal for actuating the electric motor 50. Once the swing rod 26 is rotated to the predetermined rotational angle θ, the controller 74 receives a sensor signal from the positioning sensor 46, and the electric motor 50 receives from the controller 74 a stop signal for stopping the electric motor 50. With the electric motor 50 stopped, the clutch 32 is in the engaged state, whereby the detent torque of the electric motor 50 is transmitted to the swing rod 26 so that the hammer 12 is positioned at the predetermined height. In the present embodiment, this state of the swing rod 26 being positioned at predetermined rotational angle θ is termed "initial position".

When the clutch 32 subsequently receives from the controller 74 a signal disengaging the clutch 32, the clutch 32 is placed in its disengaged state so that the hammer 12 is no longer supported by the detent torque of the electric motor 50. The hammer 12 thus drops under the action of gravity, striking the vibration-damping device 14 directly to impact oscillation force to the vibration-damping device 14. As is apparent from the aforesaid description, a hammer supporting mechanism includes the electric motor 50 and the clutch 32 in the present embodiment. Additionally, in the present embodiment, the strike portion 28 of the hammer 12 comes into strike the vibration-damping device 14 with the swing rod 26 in a horizontal attitude, so that oscillation force is applied to the vibration-damping device 14 in the vertical direction.

Rebound of the hammer 12 after striking the vibration-damping device 14 is detected by the rotary encoder 40 functioning as a rebound detection member. That is, the controller 74 receives from the rotary encoder 40 a sensor signal once the hammer 12 strike the vibration-damping device 14, causing the hammer 12 to rotate in the direction reversed to the direction of rotation under the action of gravity, i.e., in the same direction as turning of the electric motor 50. At this point, the clutch 32 receives from the controller 74 a signal for engaging the clutch 32, and the clutch 32 engages so that the detent force of the electric motor 50 is transmitted to the swing rod 26, thus holding the hammer 12 in the rebound position and preventing the hammer 12 from dropping a second time. As is understood from the preceding description, a retaining mechanism includes the controller 74, the clutch 32 and the electric motor 50, and a double-strike preventing member includes the controller 74, the clutch 32, the electric motor 50 and the rotary encoder 40 in the present embodiment.

The electric motor 50 is then actuated upon receiving a drive signal sent from the controller 74, and again rotates the swing rod 26 towards the initial position of the swing rod 26.

The acceleration sensor 72 attached to the vibration-damping device 14 struck by the strike portion 28 of the hammer 12 transmits a sensor signal to the sensor signal processor 76, and an intended damping performance data is displayed on the display portion 78.

In the present embodiment, an FFT (Fast Fourier Transform) analyzer may be employed as the sensor signal processor 76. In this case, the sensor signal from the acceleration sensor 72 may be analyzed in each frequency band by the FFT analyzer, and at least one required frequency band analysis result, which is selected from the obtained results, is subjected to appropriate processing to give an intended processing result. The processed result, in the form of a measurement signal, is demonstrated on the display portion 78 as visible information, e.g., a graph, a chart, numerical values and a light indicator lamp.

The thus obtained processed results make it possible to determine whether the vibration-damping device 14 is good or defective. Data for making the determination may preferably includes, for example, a period of time required for vibration level to attenuate to a predetermined value, vibration level magnitude after a given time interval has elapsed, magnitude of an average vibration level within a given time period, a vibration level attenuation rate, magnitude of initial vibration level or initial vibrational acceleration and the like. A frequency analysis of the processed results makes it further possible to calculate resonance frequency (i.e., an intrinsic value), and to thereby determine whether the vibration-damping device 14 is good or defective based on the calculated resonance frequency. For instance, an evaluation benchmark for determining whether a vibration-damping device 14 is good or defective may be pre-established in terms of an acceptable range of frequency or gain in the final product for the vibration-damping device 14 being evaluated, and the determination as to whether the vibration-damping device 14 is good or defective is made on the basis of whether the processed result is held in the acceptable range used as the evaluation benchmark.

Preferably, the FFT analyzer analysis may be carried out within a specific time interval after the vibration zone has begun to vibrate through striking of the vibration-damping device 14 by the hammer 12. Preferably, the FFT analyzer operation may be interlocked with the engagement/disengagement operation of the clutch 32. Means for external viewing of processed results may include display on a CRT or the like, a hard copy output onto paper, or alternatively an indicator lamp display simply indicating whether performance is satisfactory or unsatisfactory.

Figure 4:
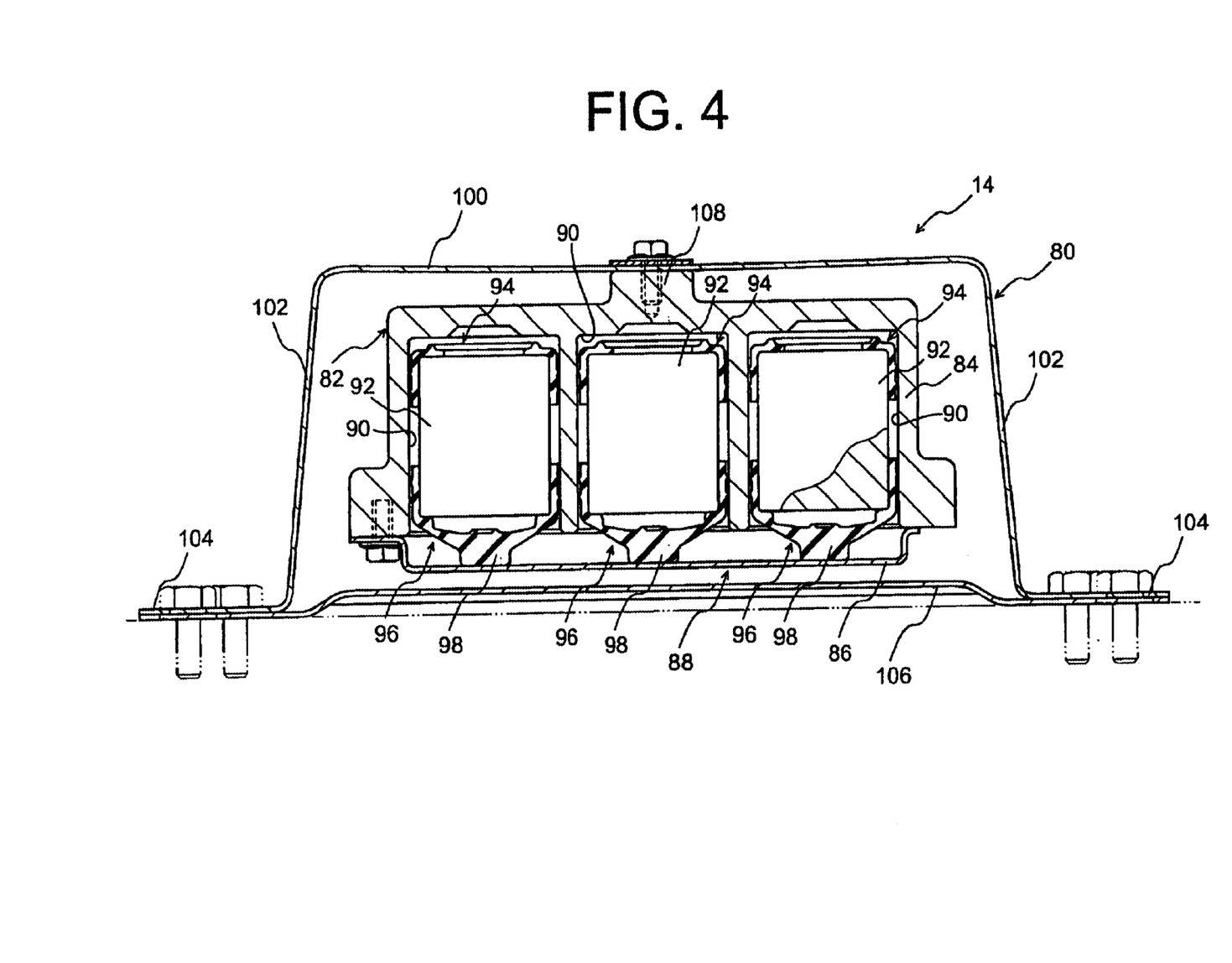
FIG. 4 is a vertical cross sectional view of an example of vibration-damping device to be evaluated by the damping performance evaluation apparatus of FIG. 1.

According to the damping performance evaluation apparatus 10 of the present embodiment, the vibration-damping device 14 having a specific construction like that shown in FIG. 4 may be selected as a target for damping performance evaluation. This vibration-damping device 14 has a construction wherein a damper mass 82 that is elastically supported by a spring member in the form of a gate shaped plate spring 80. The damper mass 82 is constructed similarly to the vibration-damping device disclosed in International Patent Application WO00/14429.

More specifically, the damper mass 82 has a rigid housing 88 composed of a housing body 84 and a housing bottom cover 86. Within the housing 88 is formed a row of three interior spaces 90, 90, 90 each of given circular cross section and extending linearly in the vertical direction.

Each interior space 90 within the housing 88 houses a single independent mass member 92. The mass member 92 is of solid cylindrical block shape having an outer configuration slightly smaller than an inner configuration of the interior space 90, and is made of iron or other high specific gravity materials. An upper cushioning cover 94 and a lower cushioning cover 96 are attached to the upper and lower axial ends of the mass member 92, respectively. These upper and lower cushioning covers 94, 96 are both made of an elastic material such as rubber. With the upper and lower cushioning covers 94, 96 attached, the maximum axial dimension and maximum diametric dimension of the mass member 92 are made smaller than the inside axial dimension and inside diametric dimension of the interior space 90 of the housing 88, respectively, thereby permitting a certain extent of free displacement of the mass member 92 within the interior space 90. When the mass member 92 independently undergoes bouncing displacement within the interior space 90, the mass member 92 comes into impact or strike against the housing 88 via the upper and lower cushioning covers 94, 96.

It should be appreciated that the lower cushioning cover 96 has an abutting portion 98 whose center section projects downwardly away from the lower end face of the mass member 92. When the abutting portion 98 is brought into abutting contact with an inner surface of an interior space 90 of the housing 88, the lower cushioning cover 96 undergoes primarily shear deformation, thereby exhibiting soft spring characteristics.

The gate shaped plate spring 80 has an integral form produced by bending a steel plate spring of longitudinal shape with constant widthwise dimension to form a horizontal upper wall portion 100, a pair of substantially vertical leg portions 102, 102 located at the two lengthwise ends of the horizontal upper wall portion 100, and fixing plate portions 104, 104 bent horizontally outward at the lower ends of leg portions 102, 102. The thus produced gate shaped plate spring 80 is fastened at the fixing plate portions 104, 104 to a damping target in the form of a vibrative member to be damped. A linking plate 106 in the form of a flat strip extends between the lower ends of the leg portions 102, 102, with the two lengthwise ends of the linking plate 104 superposed on and welded to the fixing plate portions 104, 104, thereby securing the relative positions of the leg portions 102, 102 so that the gate shaped plate spring 80 consistently retains its overall shape.

In this arrangement, the gate shaped plate spring 80 is generally provided with a rectangular frame construction by the upper wall portion 100, leg portions 102, 102, and linking plate 106, and has a substantially rectangular hollow area enclosed on four sides by the upper wall portion 100, leg portions 102, 102, and linking plate 106. The damper mass 82 of the construction described above is disposed in this hollow area with its support projection 108 fixed to the top center of the housing 88, thereby being fastened hanging down from the gate shaped plate spring 80.

With the vibration-damping device 14 constructed as described above elastically attached to the vibrative member (not shown) via the gate shaped plate spring 80, the damper mass 82 functioning as a mass member and the gate shaped plate spring 80 functioning as a spring member cooperate to form a secondary vibration system with respect to a primary vibration system, i.e., the vibrative member, whereby the vibration-damping device 14 functions overall as a dynamic damper. By suitably adjusting the mass of the damper mass 82 and a dynamic spring constant of the gate shaped plate spring 80, the natural frequency of the secondary vibration system can be tuned to a frequency band of vibration to be damped, so that the vibrative member is subjected to the damping effect of the vibration-damping device 14.

Since the damper mass 82 of the secondary vibration system houses the mass members 92 which are independently displaceable in the vertical direction that is substantially equal to a vibration input direction, the mass members 92 undergo displacement relative to the housing 88 upon application of a vibrational load, and come into impact or strike on the housing 88, thereby enhancing the damping effect of the vibration-damping device 14. Thus, the vibration-damping device is capable of exhibiting an excellent damping effect on the vibrative member.

A method for evaluating performance or performance of the vibration-damping device 14 employing the vibration-damping device damping performance evaluation apparatus 10 will be described.

First, the pair of fixing plate portions 104, 104 are placed on the support face 62 of the support block 60, and the pair of fixing plate portions 104, 104 are clamped against the support face 62 with the pair of clamps 64, 64 to secure the vibration-damping device 14 to the support block.

With the vibration-damping device 14 in this secured state, the damper mass 82 is elastically attached to the support block 60 via the gate shaped plate spring 80, thereby forming a vibration system consisting of the damper mass 82 serving as a mass member and the gate shaped plate spring 80 serving as a spring member. That is, the vibration-damping device 14 is attached to the support block 60 so as to exhibit a damping effect. In this attached state, the direction of displacement of the damper mass 82, i.e. the direction of displacement of mass members 92, is made equal to the direction of oscillation force produced when the vibration-damping device 14 is struck by the hammer 12.

In the present embodiment, the gate shaped plate spring 80 and damper mass 82 constitute vibration zones which are caused to vibrate by means of the oscillation force produced when the vibration-damping device 14 is struck by the hammer 12, and the acceleration sensor 72 is attached to the damper mass which is one of the vibration zones.

Next, there is performed a vibrating step wherein the hammer 12, which has been raised to the initial position by the electric motor 50, is allowed to drop under the action of gravity to strike the upper wall portion 100 of the gate shaped plate spring 80 of the vibration-damping device 14 which is attached to the support block 60, to apply oscillation force to the vibration-damping device 14.

A double-strike preventing step to prevent double-strike of the vibration-damping device 14 by the hammer 12 is then performed by preventing the hammer member 12 from dropping a second time upon rebound after initially striking the upper wall portion 100 of the gate shaped plate spring 80. This arrangement ensures that the vibration-damping device 14 may be subjected to a given level of oscillation force a single time, utilizing the action of gravity.

There is also performed a vibration measuring step wherein the vibrational mode of the damper mass 82 vibrated by the oscillation force created by striking with the hammer 12 is measured and processed by the sensor signal processor 76, on the basis of a sensor signal from the acceleration sensor 72.

There is then performed a sorting process wherein the vibration-damping devices 14 are sorted into good and defective units by evaluating damping performance of the vibration-damping devices 14 on the basis of whether measurement results from the sensor signal processor 76 clear the evaluation benchmark predetermined for the vibration-damping devices 14.

According to the damping performance evaluation method described above, oscillation force of given magnitude and direction may be applied to the vibration-damping device 14 (or the damper mass 82), thus providing uniform conditions for measurement over a series of tests. This makes it possible to evaluate a series of measurement results on the basis of the same evaluation benchmark.

It should be appreciated that the operating mode of the mass members 92, which has significant impact of damping performance in the vibration-damping device 14 having the particular construction described above, can be easily and accurately ascertained to be normal or not, without visual confirmation from the outside. The use of the damping performance evaluation apparatus 10 discussed above provides significant advantages in terms of reducing the percentage of defective units in shipped products and improving product reliability.

According to the present embodiment, a constant level of oscillation force is applied to the vibration-damping devices 14, so that only a single channel is required by the sensor signal processor 76, thus enabling a simpler structure.

Figure 5:
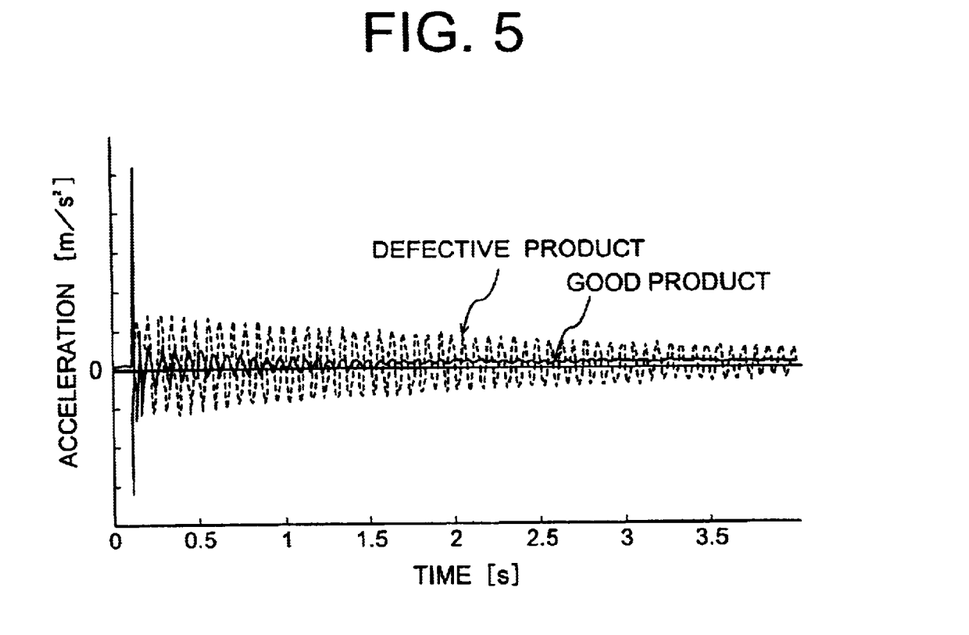
FIG. 5 is a graph demonstrating a change over time in vibration acceleration of the vibration-damping device as a measurement of the damping performance of the device.

Measurements of good and defective vibration-damping devices and evaluations thereof conducted according to the evaluation method described above arc demonstrated in graphs of FIGS. 5 and 6. In the graph of FIG. 5, the change over time in vibration acceleration of the damper mass of a vibration-damping device (good unit) having the construction described above is shown by the solid line. A similar measurement was conducted for a vibration-damping device (defective unit) having the construction described above, but with the mass members 92 fixed so as to be incapable of independent displacement relative to the housing 88. The measurement result is indicated by the broken line in the graph of FIG. 5.

Figure 6:
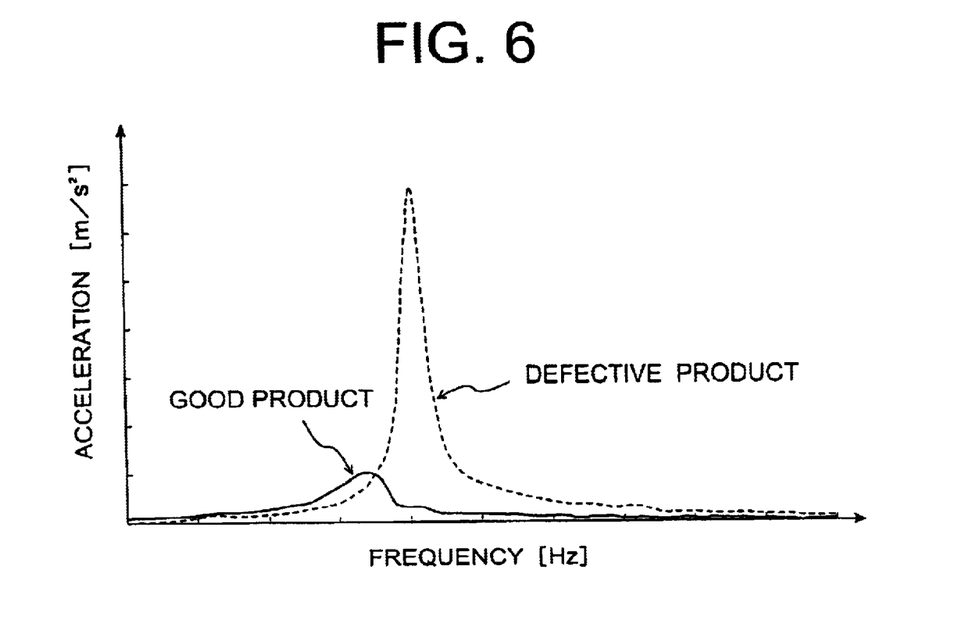
FIG. 6 is a graph demonstrating a frequency distribution in vibration acceleration of the vibration-damping device as a measurement of the damping performance of the device.

As is apparent from the measurement results shown in the graph of FIG. 5, both the good unit as an Example of the present invention and the defective unit as a Comparative Example vibrate at approximately the same magnitude of vibrational acceleration in the initial period, but vibration in the good unit is reduced in a shorter time than in the defective unit. The graph of FIG. 6 shows results of resonance frequency calculated for each vibration-damping device through frequency analysis of the measurement results in the graph of FIG. 5 using an FFT analyzer. As is apparent from the results shown in the graph of FIG. 6, the good unit has a lower magnitude of vibrational acceleration in the resonance frequency band than does the defective unit. This demonstrates that good/defective determination for a vibration-damping device product may be accomplished easily and accurately on the basis of, for example, the peak value of the sensor signal, or alternatively the frequency as well.

While the presently preferred embodiment of this invention has been described in detail for illustrative purpose only, it is to be understood that the present invention is not limited to the details of the illustrated embodiments, but may be embodied with various changes, modifications and improvements.

In the illustrated embodiment, for example, the damping performance is measured for the vibration-damping device wherein the single vibration system is composed of the damper mass and the spring member, and the independently displaceable independent mass members is disposed uncoupled to the damper mass (i.e., an abutting portion) and is adapted to come into abutting contact directly elastically with the damper mass, for the illustrative purpose only. The principle of the present invention may alternatively be employed for measuring damping performance of dynamic dampers of conventional design, such as those illustrated in FIGS. 7 and 8.

Figure 7:
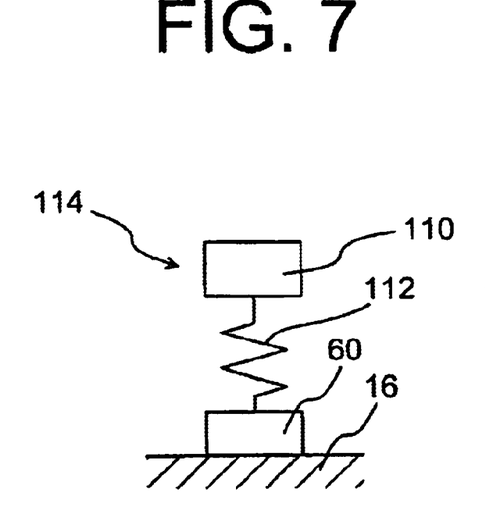
FIG. 7 is a schematic illustration of another example of vibration-damping device whose damping performance is measurable by the damping performance evaluation apparatus of FIG. 1.

Described more specifically, the damping performance evaluation apparatus 10 according to the illustrated embodiment may be used to measure damping performance of a dynamic damper 114 constructed as illustrated in FIG. 7. Namely, the dynamic damper 114 includes a mass member 110 and a spring member 112, wherein the mass member 110 is elastically supported via the spring member 112 on a vibrative member (not shown) to be damped, so as to provide a secondary vibration system for the vibrative member that functions as a primary vibration system. That is, the dynamic damper 114 is attached to the support block 60 at the portion of attachment to the vibrative member, thereby producing a single vibration system. The vibrational mode of the mass member 110 or the spring member 112 is measured when oscillation force is applied to the dynamic damper 114 by the hammer 12, enabling measurement of the damping performance of the dynamic damper 114.

Figure 8:
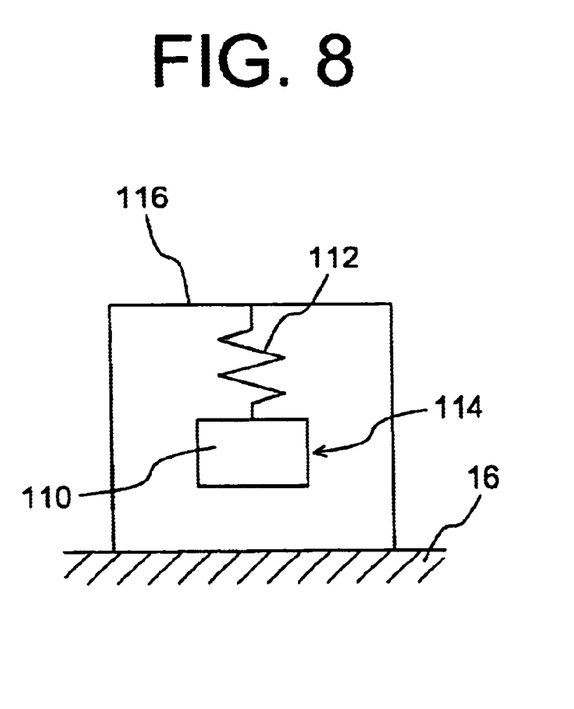
FIG. 8 is a schematic illustration of yet another example of vibration-damping device whose damping performance is measurable by the damping performance evaluation apparatus of FIG. 1.

Alternatively, as shown in FIG. 8, a secondary vibration system may be constructed by attaching an elastically deformable elastic support member 116 to the bed plate 16 and elastically supporting a mass member 110 on the elastic support member 116 via a spring member 112. Oscillation force is applied to the dynamic damper 114 by striking the elastic support member 116 with a hammer 12, and the vibrational mode of the mass member 100 or the spring member 112 vibrated by this oscillation force is measured in order to measure the damping performance of the dynamic damper 114.

The damping performance evaluation apparatus 10 of the preceding embodiment may also be employed to measure damping performance of a vibration-damping device having the construction described in WO00/14429 or JP-A-2001-271874.

Figure 9:
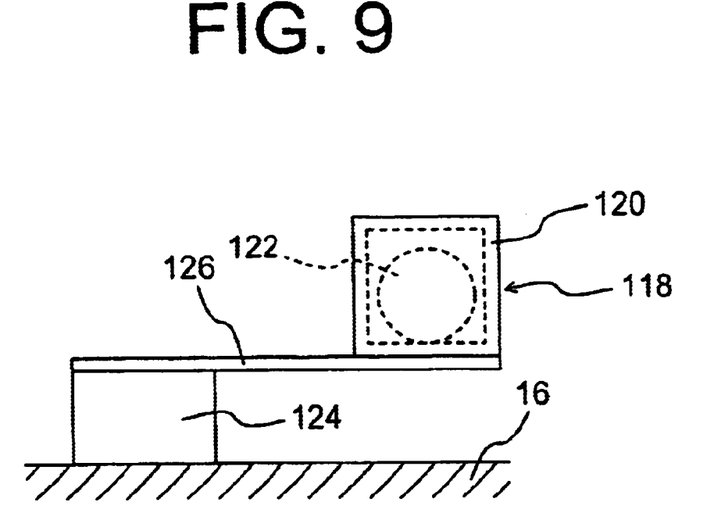
FIG. 9 is a schematic illustration of still another example of vibration-damping device whose damping performance is measurable by the damping performance evaluation apparatus of FIG. 1.

Specifically, the vibration-damping device 118 has the construction illustrated in FIG. 9, with an independent mass member 122 disposed uncoupled with and independently displaceable relative to an abutting member 120, and the independent mass member 122 comes into abutting contact directly and elastically with the abutting member 120 in the direction of input of the vibration to be damped.

When measuring damping characteristics of the vibration-damping device 118 constructed as described above, the vibration-damping device 118 is attached to an elastically deformable elastic support member 126 that is disposed extending out from a stage 124 affixed to the bed plate 16, as shown in FIG. 9. The abutting member 120 or the elastic support member 126 is then struck with the hammer 12 to apply oscillation force to the vibration-damping device 118 (or the abutting member 120), and the vibrational mode of the abutting member 120 or elastic support member 126 vibrated by the oscillation force is measured.

Figure 10:
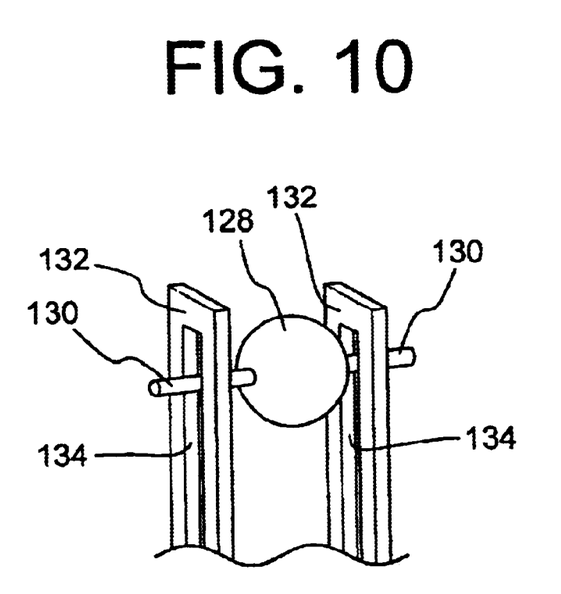
FIG. 10 is a schematic illustration of a modification of a hammer member adoptable in the damping performance evaluation apparatus of FIG. 1.

While in the illustrated embodiment the hammer member is secured to the arm member that rotates about a single axis so that the hammer member is positioned at the predetermined height through rotation of the arm member about the single axis, the hammer member may instead undergo displacement in the vertical direction, to be positioned at the predetermined height. As a specific example, illustrated in FIG. 10, a pair of guide rods 130, 130 are disposed projecting outwardly from a hammer member 128, and the pair of guide rods 130, 130 are slidably inserted into guide slots 134, 134 provided in the pair of guide plates 132, 132 that are spaced apart from each other by a predetermined distance.

While in the illustrated embodiment the hammer 12 is held at predetermined height by the detent torque of the electric motor 50, the hammer 12 may instead be held at predetermined height by a brake or other means or system employing friction.

The double-strike preventing member, the hammer supporting mechanism, and the sensing member are not limited to those described in the preceding embodiment.

It is also to be understood that the present invention may be embodied with various other changes, modifications and improvements, which may occur to those skilled in the art, without departing from the spirit and scope of the invention defined in the following claims.

What is claimed is:

1. A damping performance evaluation apparatus for vibration-damping devices comprising:

a support member adapted to detachably support a vibration-damping device in a state enabling the vibration-damping device to exhibit a damping effect thereof;

a hammer member for applying oscillation force to the vibration-damping device, caused by means of gravitational action to descend to strike directly or indirectly the vibration-damping device supported by said support member;

a double-strike preventing member for preventing said hammer member from dropping a second time due to rebound after initially striking the vibration-damping device, so as to prevent double-strike of the vibration-damping device by said hammer member;

a vibration sensor installed at a vibration zone caused to vibrate through oscillation force applied by said hammer member, for outputting an electrical signal in response to vibration at the vibration zone; and a sensing member for sensing a vibration mode in the vibration zone on the basis of an output of said vibration sensor, wherein said apparatus is adapted to evaluate a damping performance of at least a vibration-damping device that constitutes a secondary vibration system wherein a damper mass is elastically supported on a damping target via a spring member, said vibration-damping device being supported by means of said support member at a mounting part thereof on the damping target, and said hammer member being caused to strike the vibration-damping device directly or indirectly to apply said oscillating force to the vibration-damping device.

2. A damping performance evaluation apparatus according to claim 1, further comprising a hammer supporting mechanism for supporting said hammer member at a predetermined height, and for releasing said hammer member so as to allow said hammer member to descend under said gravitational action.

3. A damping performance evaluation apparatus according to claim 2, wherein said hammer supporting mechanism includes an electric motor and a detent torque of said electric motor is utilized to support said hammer member at said predetermined height.

4. A damping performance evaluation apparatus according to claim 2, further comprising a lift driving device for lifting said hammer member against gravitational force and causing said hammer member to be supported at said predetermined height by said hammer supporting mechanism.

5. A damping performance evaluation apparatus according to claim 1, wherein said double-strike preventing member comprises: a rebound detection member for detecting displacement of said hammer member due to said rebound after initially striking the vibration-damping device; and retaining mechanism actuated on the basis of an output of said rebound detection member for retaining said hammer member rebounded after initially striking the vibration-damping device.

6. A damping performance evaluation apparatus according to claim 5, wherein said retaining mechanism includes an electric motor and a detent torque of said electric motor is utilized to retain said hammer member rebounded after initially striking the vibration-damping device.

7. A damping performance evaluation apparatus according to claim 1, further comprising an arm member rotatably supported about a single axis, wherein said hammer member is fixed to an distal end of said arm member, and said arm member is rotatable about said single axis to support said hammer member at said predetermined height, and then to allow said hammer member to descend under gravitational action to strike directly or indirectly the vibration-damping device supported by said support member.

8. A damping performance evaluation apparatus according to claim 7, wherein said hammer member comes into strike the vibration-damping device with said arm member in a horizontal attitude so that said oscillation force is applied to the vibration-damping device in a vertical direction.

9. A damping performance evaluation apparatus according to claim 7, further comprising a supplemental mass formed independently of said hammer member and attached to said arm member.

10. A damping performance evaluation apparatus according to claim 1, wherein said vibration sensor is detachably attachable to the vibration zone by means of a magnet.

11. A damping performance evaluation apparatus constructed according to claim 1, wherein said damper mass includes a rigid abutting portion and an independent mass member disposed on said rigid abutting portion such that said independent mass member is uncoupled from and independently displaceable relative to the rigid abutting portion, and that said independent mass member is brought into direct and elastic abutting contact with said rigid abutting portion in a direction of input of vibration to be damped.

12. A damping performance evaluation apparatus according to claim 1, said apparatus being adapted to evaluate a damping performance of at least a vibration-damping device including an abutting member fixable to a damping target and an independent mass member disposed on said abutting member such that said independent mass member is uncoupled from and independently displaceable relative to said abutting member, and that said independent mass member is brought into direct and elastic abutting contact with said abutting member in a direction of input of vibration to be damped, wherein an elastically deformable support member is provided in said support member, said abutting member of said vibration-damping device is fixed to said elastic support member, and said oscillation force is applied to said vibration-damping device by directly or indirectly striking said abutting member with said hammer member.

13. A damping performance evaluation method for vibration-damping devices comprising:
  a vibrating step wherein a hammer member is dropped from a predetermined height under gravitational action to directly or indirectly strike a vibration-damping device and apply oscillation force to said vibration-damping device;
  a double-strike preventing step wherein double-strike of said vibration-damping device with said hammer member is prevented by preventing said hammer member from dropping a second time upon rebound after initially striking said vibration-damping device;
  a vibration measuring step wherein vibration mode in a vibration zone vibrated by means of said oscillation force of said hammer is measured; and
  a sorting step wherein vibration-damping devices are sorted into good products and defective products on the basis of results of measurement in said vibration measuring step.

14. A vibration-damping device testing method wherein a damping performance evaluation method, which comprises: a vibrating step wherein a hammer member is dropped from a predetermined height under gravitational action to directly or indirectly strike a vibration-damping device and apply oscillation force to said vibration-damping device; a double-strike preventing step wherein double-strike of said vibration-damping device with said hammer member is prevented by preventing said hammer member from dropping a second time upon rebound after initially striking said vibration-damping device; a vibration measuring step wherein vibration mode in a vibration zone vibrated by means of said oscillation force of said hammer is measured; and a sorting step wherein vibration-damping devices are sorted into good products and defective products on the basis of results of measurement in said vibration measuring step, is implemented using a damping performance evaluation apparatus comprising: a support member adapted to detachably support a vibration-damping device in a state enabling the vibration-damping device to exhibit a damping effect thereof; a hammer member for applying oscillation force to the vibration-damping device, caused by means of gravitational action to descent to strike directly or indirectly the vibration-damping device supported by said support member; a double-strike preventing member for preventing said hammer member from dropping a second time due to rebound after initially striking the vibration-damping device, so as to prevent double-strike of the vibration-damping device by said hammer member; a vibration sensor installed at a vibration zone caused to vibrate through oscillation force applied by said hammer member, for outputting an electrical signal in response to vibration at the vibration zone; and a sensing member for sensing a vibration mode in the vibration zone on the basis of an output of said vibration sensor, at a point between production and shipment of vibration-damping devices.

* * * * *